United States Patent
Mao et al.

(10) Patent No.: US 7,574,868 B2
(45) Date of Patent: Aug. 18, 2009

(54) MIXTURE INCLUDING HYDROGEN AND HYDROCARBON HAVING PRESSURE-TEMPERATURE STABILITY

(75) Inventors: Wendy L. Mao, Washington, DC (US); Ho-Kwang Mao, Washington, DC (US)

(73) Assignee: Carnegie Institution of Washington, Washington, DC (US)

( * ) Notice: Subject to any disclaimer, the term of this patent is extended or adjusted under 35 U.S.C. 154(b) by 323 days.

(21) Appl. No.: 11/334,348

(22) Filed: Jan. 19, 2006

(65) Prior Publication Data

US 2006/0248920 A1  Nov. 9, 2006

Related U.S. Application Data

(60) Provisional application No. 60/644,998, filed on Jan. 21, 2005.

(51) Int. Cl.
F17C 11/00 (2006.01)
F17C 7/00 (2006.01)
F17C 9/02 (2006.01)
C07C 11/00 (2006.01)
C10L 1/16 (2006.01)
C07C 9/00 (2006.01)
C10M 101/02 (2006.01)

(52) U.S. Cl. .................. 62/46.2; 62/54.2; 62/54.3; 585/14; 585/16

(58) Field of Classification Search .............. 62/601, 62/46.2, 54.2, 54.3; 48/61; 585/14, 16

See application file for complete search history.

(56) References Cited

U.S. PATENT DOCUMENTS

| | | | | |
|---|---|---|---|---|
| 3,147,593 A | * | 9/1964 | Garrett | 60/39.465 |
| 3,354,662 A | * | 11/1967 | Daunt | 62/601 |
| 3,455,117 A | * | 7/1969 | Prelowski | 62/54.1 |
| 4,305,256 A | * | 12/1981 | Anderson et al. | 44/265 |
| 4,339,252 A | | 7/1982 | Bell et al. | 62/35 |
| 4,386,950 A | | 6/1983 | Bell et al. | 62/10 |
| 5,434,330 A | | 7/1995 | Hnatow et al. | 585/864 |
| 5,705,771 A | * | 1/1998 | Flynn et al. | 149/1 |
| 6,003,300 A | * | 12/1999 | Bates | 60/204 |
| 6,101,808 A | * | 8/2000 | Knuth et al. | 60/251 |
| 6,417,415 B1 | * | 7/2002 | Sakaguchi et al. | 585/3 |
| 6,735,960 B2 | | 5/2004 | Mao et al. | 62/46.1 |
| 7,132,571 B2 | * | 11/2006 | Atwood et al. | 564/308 |
| 7,152,675 B2 | * | 12/2006 | Heard | 166/245 |

OTHER PUBLICATIONS

Wendy Mao et al., "Hydrogen Clusters in Clathrate Hydrate," Science, vol. 297 pp. 2247-2249, Sep. 27, 2002.
Willem L. Vos et al., "Novel $H_2$-$H_2O$ Clathrates at High Pressures," Physical Review Letters, vol. 71, No. 19, pp. 3150-3153, Nov. 8, 1993.

* cited by examiner

*Primary Examiner*—William C Doerrler
(74) *Attorney, Agent, or Firm*—Morgan Lewis & Bockius LLP

(57) ABSTRACT

The invention relates to a method of storing hydrogen that employs a mixture of hydrogen and a hydrocarbon that can both be used as fuel. In one embodiment, the method involves maintaining a mixture including hydrogen and a hydrocarbon in the solid state at ambient pressure and a temperature in excess of about 10 K.

4 Claims, 5 Drawing Sheets

MIXTURE INCLUDING HYDROGEN AND HYDROCARBON HAVING PRESSURE-TEMPERATURE STABILITY

This application claims priority of copending provisional application No. 60/644,998, filed on Jan. 21, 2005.

STATEMENT OF RIGHTS TO INVENTIONS MADE UNDER FEDERALLY SPONSORED RESEARCH

This invention was made with U.S. government support under grant numbers DE-FG02-99ER45775 and DE-FC03-03NA00144 from the Department of Energy, DMR 0079513 from the National Science Foundation, and NAG5-11613 from NASA. Accordingly, the U.S. Government may therefore have certain rights in the invention.

BACKGROUND OF THE INVENTION

1. Field of the Invention

The present invention relates to a method of storing hydrogen and to a compound including hydrogen and a hydrocarbon and more particularly, to a compound including hydrogen and hydrocarbon having pressure-temperature stability.

2. Discussion of the Related Art

The technology of using hydrogen as an environmentally clean and efficient fuel is an active research area worldwide. Liquid hydrogen, which carries a high density of hydrogen (70 g/liter) and is a commonly used form in prototype automobiles, is very energy intensive; up to 40% of the energy content must be spent to liquefy hydrogen at its very low condensation temperature T of 20° K. This low temperature T cannot be provided by practical and inexpensive cooling agents, e.g., liquid nitrogen (>77° K.); hence, the continuous boil-off of liquid hydrogen poses problems to on-board storage. Compressed hydrogen gas, also a commonly used storage system, typically only holds 15 g/liter at 35 MPa. Higher pressures could hold higher hydrogen densities, but are complicated by safety concerns and logistical obstacles. Other storage methods, including molecular hydrogen adsorption on solids of large surface (e.g., carbon nanotubes) and bonded atomic hydrogen in hydrocarbons or in metal hydrides, have been developed extensively to address key issues of hydrogen content, P-T conditions of synthesis and storage, and on-board hydrogen release.

Storing molecular hydrogen in the host of planetary ices (i.e., major constituents of icy satellites such as $H_2O$, $CH_4$, $NH_3$, $CO_2$, etc.) and other larger molecules as a crystalline molecular compound may provide an attractive alternative method for hydrogen storage. A great variety of gas-ice molecular compounds have been synthesized by varying the P-T conditions and the chemistry of the gases and ices, but systems involving molecular hydrogen have scarcely been studied. Two binaries, $H_2$—$H_2O$ (6) and $H_2$—$CH_4$, were previously investigated at high P and 300° K. for their planetary and physical chemistry interest, resulting in the synthesis of a myriad of hydrogen-rich, crystalline compounds. They include $H_2(H_2O)_6$ (23 g/liter hydrogen), which is stable above 700 MPa; $H_2(H_2O)$ (110 g/liter hydrogen), which is stable above 2,200 MPa; and $H_2(CH_4)_2$, $H_2(CH_4)$, $(H_2)_2(CH_4)$, and $(H_2)_4(CH_4)$, which are stable between 4,500 and 8,000 MPa. These pressures, however, are too high; the hydrogen-bearing solids must be brought to near ambient P to be of practical interest for hydrogen storage. There is still a need for new mixture capable of retaining a significant amount of hydrogen in the moderately low temperature T (20°-300° K.) region. Furthermore, there is a need for methods of storing hydrogen using such compounds.

SUMMARY OF THE INVENTION

Accordingly, the present invention is directed to a method of storing hydrogen that substantially obviates one or more of the problems due to limitations and disadvantages of the related art.

An object of the present invention is to provide a method of storing hydrogen that uses a mixture of hydrogen and hydrocarbons that is stable at relatively high temperature and near ambient pressures.

Another object of the present invention is to provide a method of storing hydrogen that employs a mixture of hydrogen and hydrocarbon that can both be used as fuel.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, the applicants invention, in one embodiment, is directed to a method of storing hydrogen, which comprises maintaining a mixture including hydrogen and a hydrocarbon in the solid state at ambient pressure and a temperature just in excess of about 10 K.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE PREFERRED EMBODIMENTS

Reference will now be made in detail to the preferred embodiments of the present invention, examples of which are illustrated in the accompanying drawings.

At high pressure (P), molecular hydrogen and other closed shell systems can form a number of stoichiometric solid compounds with other simple molecules (e.g., $H_2O$, Ar, $CH_4$). As an important component of molecular cluster studies, van der Waals solid compounds are of interest from a fundamental point of view. Van der Waals solid compounds allow the study of interactions in weakly interacting molecular and atomic systems in different crystalline environments at high density.

They exhibit many interesting materials properties with relevance to many fields. For example, those containing molecular hydrogen may be significant for planetary science, because $H_2$ is the most abundant molecular species in the universe. These hydrogen-rich materials are also of potential technological interest.

As discussed in Mao and Mao, "Hydrogen Storage In Molecular Compounds", Proc. Nat. Acad. Sci., Vol. 101, No. 3, pp. 708-710, Jan. 20, 2004 which is hereby incorporated in its entirety, the stability field of $(H_2)_4(CH_4)$, H4M, which was small (5,000-6,000 MPa) at 300° K., greatly expanded and became the only molecular compound between $H_2$ and $CH_4$ at 1600 K and 1,000 MPa. The H4M was identified by using Raman spectroscopy because it was found to be the only $H_2$—$CH_4$ compound having a hydrogen vibron peak at lower energy than the Q1(1) vibron. Further, hydrogen forms at least four molecular compounds with methane. One of particular interest from a hydrogen storage standpoint is $(H_2)_4CH_4$ (H4M). H4M has the highest hydrogen content of any currently known stoichiometric compound, containing 50.2 wt % hydrogen including the hydrogen in methane, 33.4 wt % only considering the molecular hydrogen component, making it a promising hydrogen storage candidate. In addition, methane can be used as a secondary fuel. A practical hydrogen storage method should satisfy a number of requirements (e.g., high hydrogen content per unit mass and volume, moderate synthesis pressure P, near ambient pressure P and moderate temperature (T) for storage, easy hydrogen release, and environmentally friendly byproducts).

Diamond anvil cell (DAC) studies allow characterization of gas mixtures at high P over a range of T via a number of in situ techniques. Melting represents a very important transition in H4M for determining its potential as a hydrogen storage material. Information on the melting curve of H4M at high pressure P (up to 6 GPa) and low temperature T (down to 10° K.) can be obtained using optical microscopy and Raman spectroscopy.

Figure 1:
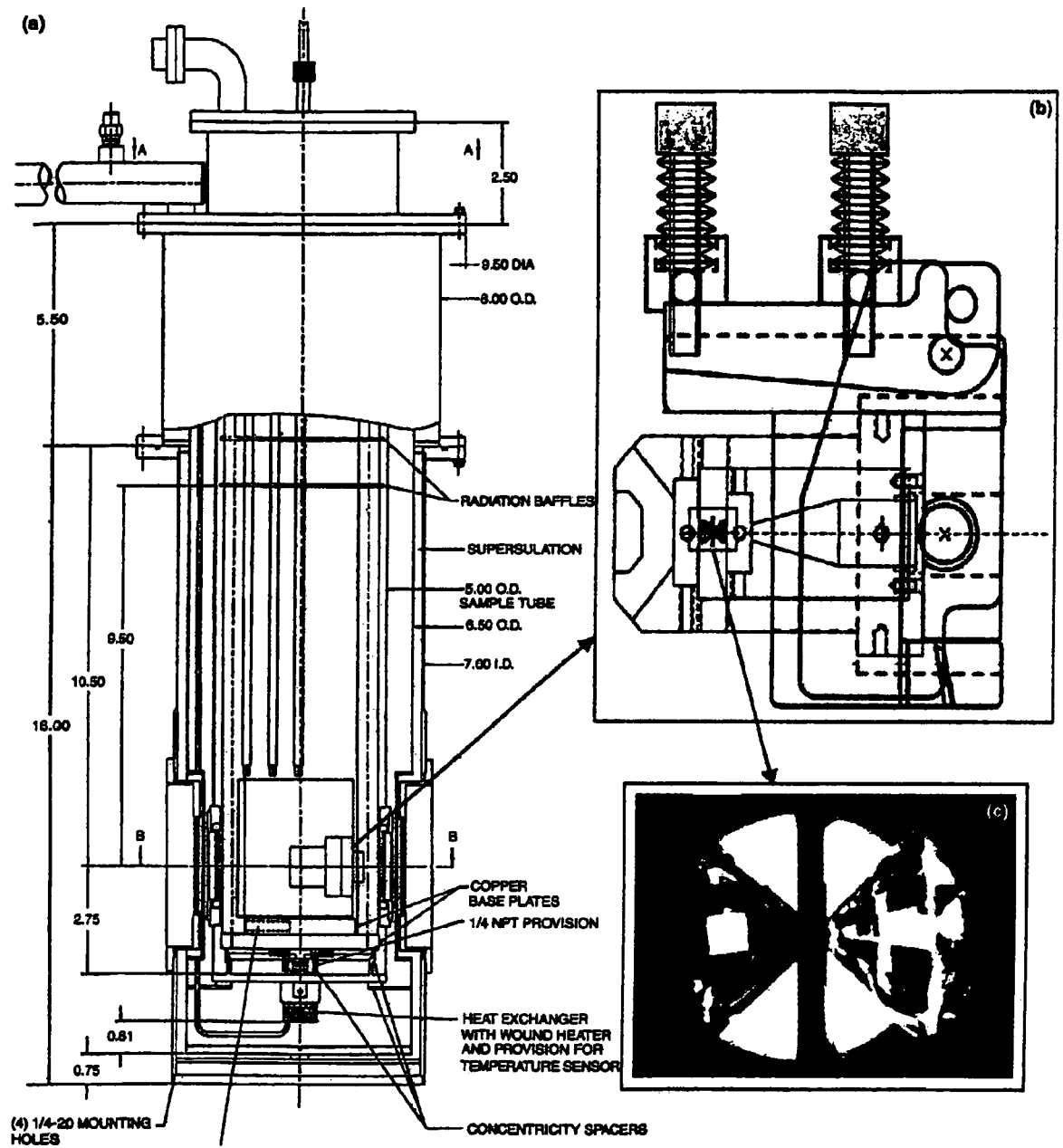
FIG. 1 illustrates a Schematic of an experimental set-up using a cryostat and a diamond anvil cell in lever arm with a close-up of opposing diamond anvils compressing a sample within a BeCu gasket.

FIG. 1 illustrates a schematic of an experimental set-up using a cryostat and a diamond anvil cell (DAC) in lever arm with a close-up of opposing diamond anvils compressing a sample within a BeCu gasket. A DAC with 0.7 mm diameter diamond culets, and 0.25 mm thick BeCu gaskets (to minimize reaction with hydrogen) and drilled 0.3 mm diameter holes to contain the sample. Several small ruby grains were used as the pressure calibrant. The DAC was inserted in a gas pressure vessel where a nominally 4:1 mixture of $H_2$ and $CH_4$ gases (80.6 and 19.4 mole %, respectively) were compressed to 200 MPa. After clamp-sealing the sample in the gasket at 1 GPa, the DAC was removed from the gas vessel and further compressed using a lever arm. The whole assembly was then introduced into a cryostat which was cooled using liquid nitrogen and liquid helium. A silicon diode was attached to the DAC near the sample to measure temperature. The DAC was equipped with retracting springs to ensure complete pressure reduction in the cryostat.

Figure 2:
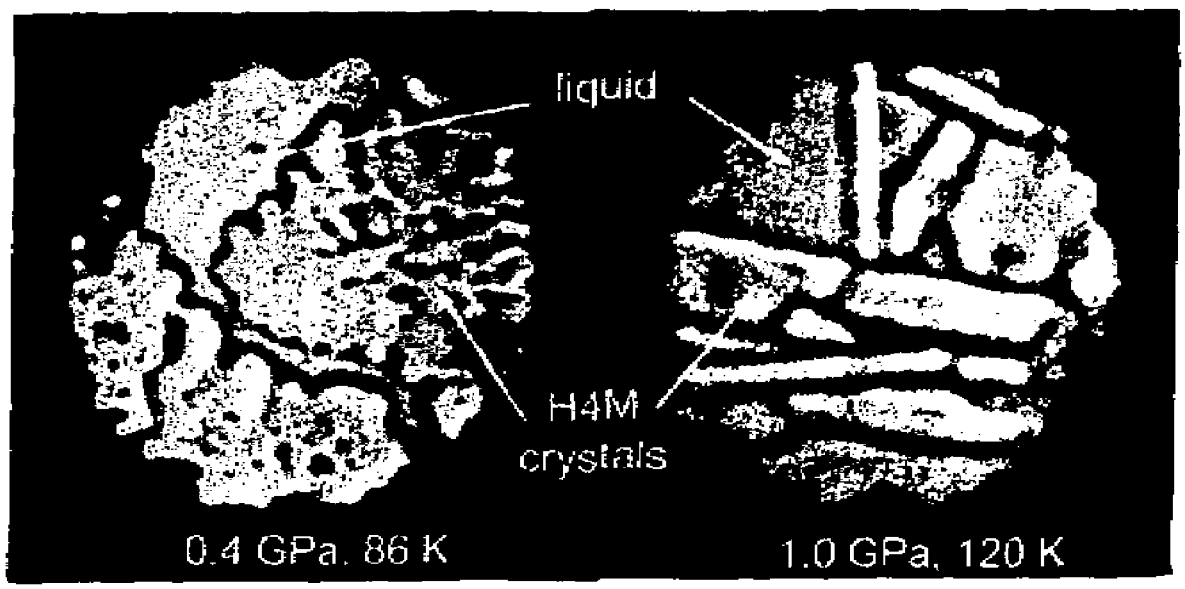
FIG. 2 illustrates grown crystal grains.

Melting and crystallization of the sample were observed in situ at high pressure P and low temperature T using optical microscopy and Raman spectroscopy. The sample was initially a fluid mixture of $H_2$ and $CH_4$. After crystallization, the sample was found to be in a single phase H4M. FIG. 2 illustrates grown crystal grains. Melting was observed by shrinking of crystal grains and rounding of their edges before they eventually completely transformed into the fluid phase.

Figure 3A:
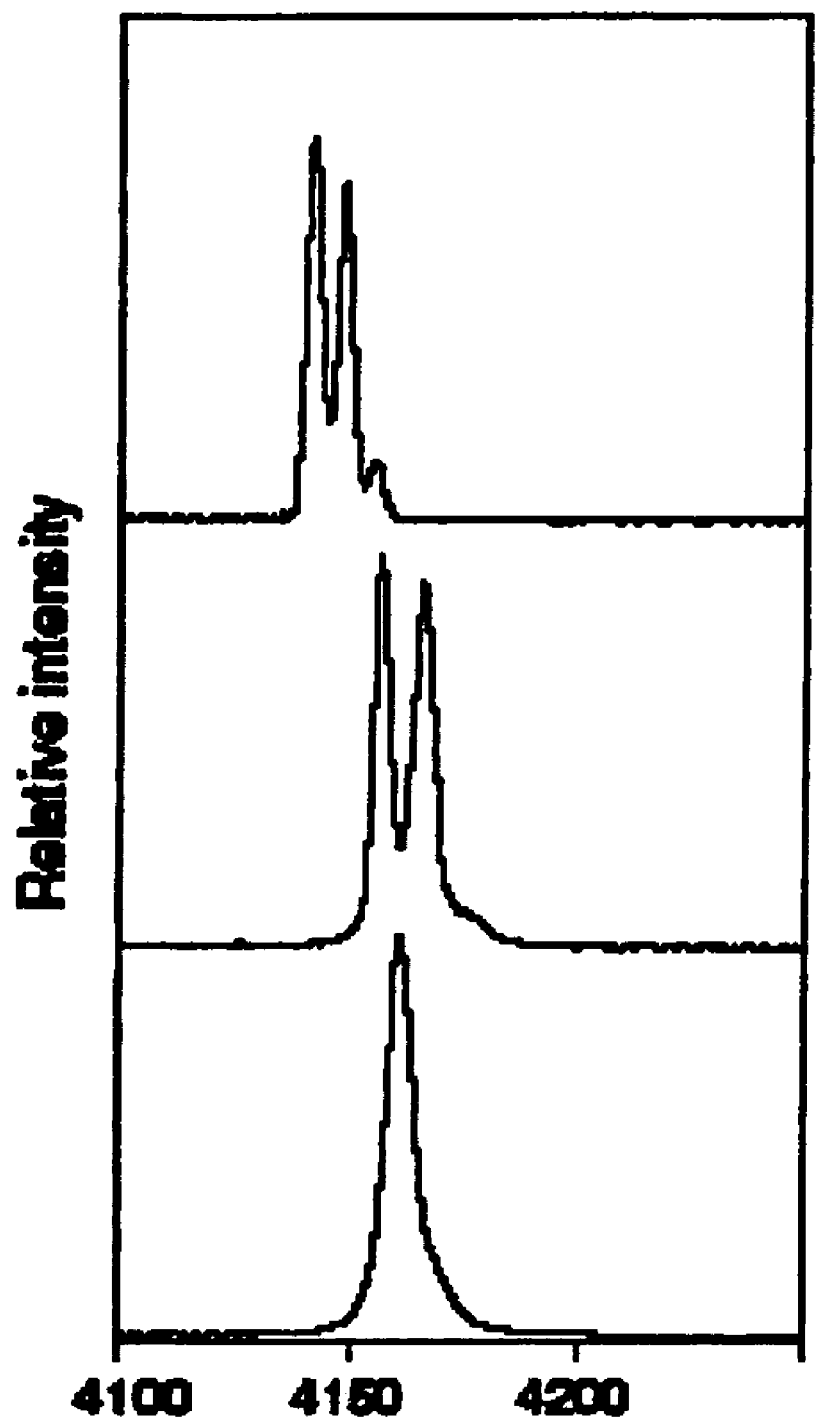
FIG. 3a illustrates a Raman spectra for fluid $H_2$—$CH_4$ and solid H4M in the hydrogen vibron region.

Raman measurements were performed with 488 or 514.5 nm $Ar^+$ ion laser lines. Two areas of interest in the Raman spectra were the hydrogen vibron region, shown in FIG. 3a, and the CH stretch region, shown in FIG. 3b. The hydrogen vibron ($Q_1(J)$) in the Raman spectra for the liquid and solid were quite diagnostic for determining when the sample melted or solidified. At the P-T of interest here, the hydrogen molecules are non-rigid rotors, and essentially the only populated states are the J=0 and J=1 molecular rotational states, i.e., the ground states of para (p-$H_2$) and ortho molecules (o-$H_2$), respectively. The hydrogen molecules at the start of the experiments are in the normal ratio of spin states (n-$H_2$) which is a 3:1 mixture of the ortho- and para-species.

Based on the generalized binary random alloy approximation, it has been previously demonstrated that the multiplet of Q lines collapses into a single $Q_1(1)$ line with a diminishing $Q_1(0)$ over a small range of pressure. As shown in the fluid Raman vibron spectra, the hydrogen $Q_1(1)$ peak, $v_{f1}$ in FIG. 3a, dominate with a weak $Q_1(0)$ side peak ($v_{f2}$) at slightly higher frequency. The hydrogen in H4M solid, however, shows two equally strong peaks ($v_{s1}$ and $v_{s2}$) and a weak side peak ($v_{s3}$). Previous publications indicated that the observed doublet was due to a two phase region (i.e., $v_{s2}$ corresponding to fluid hydrogen and $v_{s1}$ due to H4M), but we found that both peaks occurred when the sample completely solidified. The $v_{s1}$ and $v_{s2}$ doublet can only be attributed to H4M and must be due to either factor group splitting or two distinct $H_2$ sites in the unit cell. The weak $v_{s3}$ peak is thus the $Q_1(0)$ branch of $v_{s2}$. This information will provide constraints on the crystal structure and symmetry of H4M, which have not yet been determined. The slight negative shift of $v_{s1}$ relative to $v_{f1}$ may indicate weak bonding and stabilization of hydrogen in H4M.

Figure 3B:
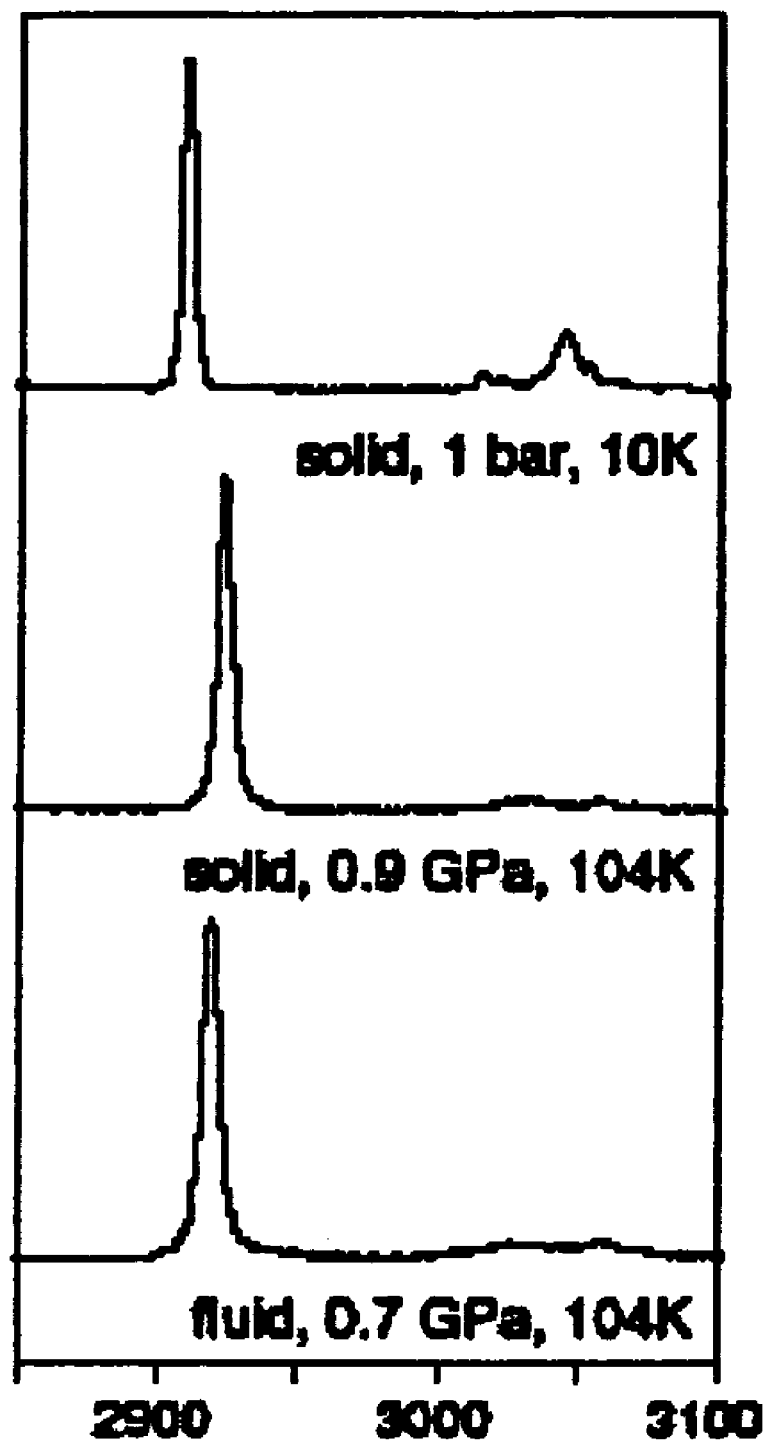
FIG. 3b illustrates a Raman spectra for fluid $H_2$—$CH_4$ and solid H4M in the C—H stretch region.

The vibrational properties of pure crystalline $CH_4$ are well understood. The totally symmetric C—H stretching mode $v_1(A1)$ of $CH_4$ gives the strongest Raman band between 2900 and 2950 $cm^{-1}$, and the triply degenerate $V_3$ (F2) mode gives a weak band at 3100 and 3150 $cm^{-1}$. In the present hydrogen and methane mixture, the $v_1(A1)$ remains a single peak, whereas the $v_3$ (F2) splits into doublet and triplet at low temperatures, as shown in FIG. 3b. There is little difference between the Raman spectra of $CH_4$ in the fluid and in H4M solid.

The sample was repeatedly cycled down in temperature to crystallize the fluid and then down in pressure to melt the solid in order to follow the melting line. The P-T conditions at which crystallization or melting of the sample was observed are listed in Table 1 below and plotted in FIG. 4.

TABLE 1

| P (GPa) | T (K) | Phase(s) | Change | P–T$_a$ | $v_{s1}$ ($cm^{-1}$) | $v_{s2}$ ($cm^{-1}$) | $v_{s3}$ ($cm^{-1}$) | $v_{f1}$ ($cm^{-1}$) | $v_{f2}$ ($cm^{-1}$) |
|---|---|---|---|---|---|---|---|---|---|
| 6.02 | 300 | Solid | Solidified | P up | | | | | |
| 5.58 | 300 | Fluid | Melt | P down | | | | | |
| 5.2 | 283 | Solid | Solidified | T down | 4200.1 | 4210.3 | — | | |
| 4.9 | 275 | Fluid | Melt | P down | | | | 4208.0 | 4218.6 |
| 4.76 | 272 | Solid | Solidified | T down | 4198.0 | 4207.4 | — | | |
| 4.42 | 270 | Fluid | Melt | P down | | | | 4205.0 | 4216.3 |

TABLE 1-continued

| P (GPa) | T (K) | Phase(s) | Change | P-T$_a$ | $v_{s1}$ (cm$^{-1}$) | $v_{s2}$ (cm$^{-1}$) | $v_{s3}$ (cm$^{-1}$) | $v_{f1}$ (cm$^{-1}$) | $v_{f2}$ (cm$^{-1}$) |
|---|---|---|---|---|---|---|---|---|---|
| 4.32 | 265 | Fluid | No change | T down | | | | | |
| 4.28 | 261 | Solid | Solidified | T down | 4194.3 | 4204.5 | — | | |
| 4.01 | 261 | Fluid | Melt | P down | | | | 4201.6 | 4211.4 |
| 3.95 | 225 | Fluid | No change | T down | | | | | |
| 3.83 | 224 | Solid | Solidified | T down | 4189.3 | 4198.2 | — | | |
| 3.1 | 225 | Fluid | Melt | P down | | | | 4193.3 | 4203.9 |
| 2.98 | 178 | Solid | Solidified | T down | 4179.3 | 4186.3 | — | | |
| 1.89 | 173 | Fluid | Melt | P down | | | | 4175.9 | 4187.3 |
| 2.2 | 172 | Solid | Solidified | P up | 4172.6 | 4182.4 | 4191.6 | | |
| 1.94 | 172 | Fluid | Melt | P down | | | | | |
| 1.61 | 126 | Solid | Solidified | T down | 4163.6 | 4171.1 | 4186.4 | | |
| 1.02 | 119 | Fluid + solid | Melt | P down | | | | | |
| 0.89 | 120 | Fluid | Melt | P down | | | | 4163.9 | 4172.9 |
| 0.89 | 104 | Solid | Solidified | T down | 4156.3 | 4165.5 | 4176.9 | | |
| 0.7 | 107 | Fluid | Melt | P down | | | | 4160.7 | 4169.1 |
| 0.67 | 95 | Solid | Solidified | T down | 4152.68 | 4161.5 | 4172.8 | | |
| 0.47 | 96 | Fluid | Melt | P down | | | | 4155.6 | 4164.6 |
| 0.48 | 88 | Solid | Solidified | T down | | | | | |
| 0.35 | 90 | Fluid | Melt | P down | | | | | |
| 0.36 | 86 | Solid | Solidified | Tdown | | | | | |
| 0.42 | 10 | Solid | No change | P down | 4147.8 | 4155.4 | 4163.9 | | |
| 0.17 | 10 | Solid | No change | P down | 4142.0 | 4148.4 | 4155.4 | | |
| 0 | 10 | Solid | No change | P down | 4141.1 | 4147.9 | 4154.7 | | |
| 0 | 22 | | Decompose$_b$ | T up | | | | | |

Figure 4:
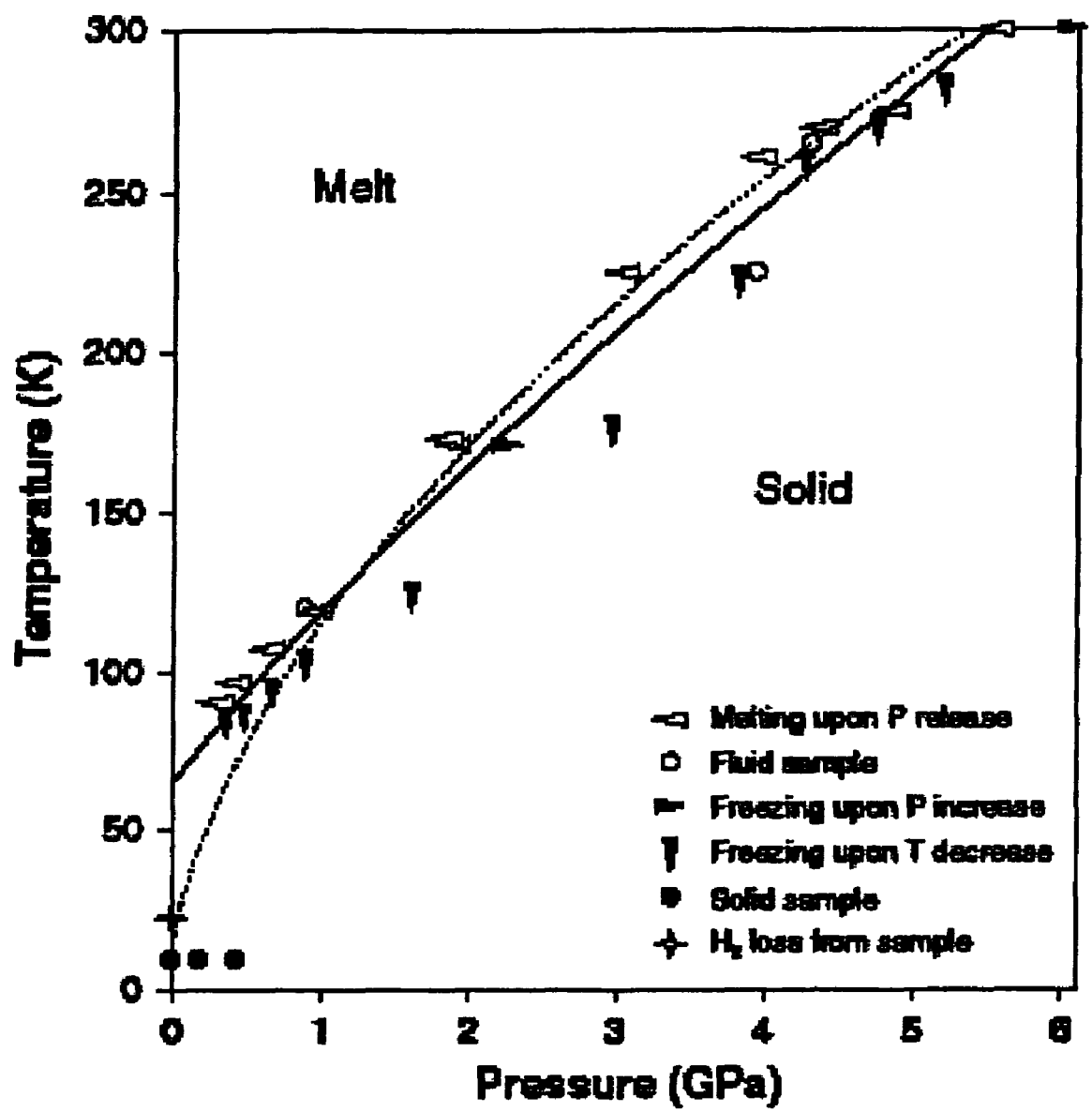
FIG. 4 illustrates a melting curve for H4M.

There appeared to be considerable metastability at moderate P-T during the temperature T cycle; the fluid required significant undercooling to solidify; e.g., at 3 and 4 GPa the undercooling is as much as 40° K. The hysteresis appears much less during the pressure P cycle; e.g., at 1720 K the P hysteresis is only 0.3 GPa. Without wishing to be bound by theory, it is thought that this may have been due to the fact that pressure P was changed with significant strain and disturbance of the sample that promoted the phase transformation. Hysteresis in the phase diagram at low temperature T is not unexpected and is an encouraging sign since the melting curve intersects ambient pressure at 64° K. At lower T (i. e., about 100 K), the degree of undercooling and under pressuring seemed significantly reduced. The melting point was determined as the midpoint between the onset of crystallization and the onset of melting. The data was fit to an empirical melting Simon-Glatzel Law, $$P(GPa)=2.67\times 10^{-3} T(K) 1.36-0.771,$$

which is shown in FIG. 4. The data are within experimental error of the fit. Extrapolating to low pressure, the melting curve intersects ambient pressure at 64K.

After reaching liquid nitrogen temperature, the solid was cooled to 10° K. using liquid helium and then pressure P was slowly released. The solid was quenched at 10° K. and the nominal vacuum of the cryostat. Upon increasing temperature T, the sample decomposed at 23° K., which is higher than the liquid boiling point of hydrogen. In other words, the sample lost all of its hydrogen and left a solid methane at 23° K. This is less than the 64° K. predicted from the melting curve, but one factor to consider is the negligible hydrogen partial pressure in the helium cryostat. H4M will be able to be retained at much higher temperature T with a modest hydrogen partial pressure (e.g., 10 bar), thus enabling storage of high hydrogen content in a solid at a practical P-T. Although, the melting curves of H4M and pure hydrogen are similar above 1 GPa, they differ significantly at lower pressure P where the application to hydrogen storage is relevant. The H4M solid is stabilized to 40° K. higher temperature T than pure hydrogen at the same pressure P, as shown in FIG. 4.

The melting curve of FIG. 4 for H4M from ambient to high pressure P (6 GPa) and down to low temperature T (10° K.) shows that H4M has potential to store hydrogen at ambient P and low T. Further experiments on larger sample volumes in gas reaction chambers with an appreciable hydrogen partial pressure will help clarify the stability at low T and would provide more accurate P measurements. Also, the use of promoter molecules may stabilize H4M to higher temperature T at ambient pressure P. Previous X-ray diffraction studies indicate that the phase may have a tetragonal methane substructure, but these experiments were limited due to the small pressure P interval over which H4M is stable at ambient temperature T. Additional X-ray and neutron diffraction experiments at lower temperature T are required to address this question. The wide stability range of this hydrogen-rich van der Waals compound provides important information on the origin and density dependence of the intermolecular interactions in this interesting class of materials.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

REFERENCES

All publications and patent applications herein are incorporated by reference to the same extent as if each individual publication or patent application was specifically and individually indicated to be incorporated by reference.

[1] W. L. Vos, L. W. Finger, R. J. Hemley, H. K. Mao, Phys. Rev. Lett. 71 (1993) 3150.

[2] P. Loubeyre, R. Letoullec, J. P. Pinceaux, Phys. Rev. Lett. 72 (1994) 1360.

[3] J. A. Schouten, J. Phys.: Condens. Matter 7 (1995) 469.

[4] M. S. Somayazulu, L. W. Finger, R. J. Hemley, H. K. Mao, Science 271 (1996) 1400.

[5] W. L. Mao, H. K. Mao, A. F. Goncharov, V. V. Struzhkin, Q. Guo, J. Hu, J. Shu, R. J. Hemley, M. Somayazulu, Y. Zhao, Science 297 (2002) 2247.

[6] E. R. Bernstein, Atomic and Molecular Clusters, Elsevier, Amsterdam, New York, 1990.

[7] E. L. Knuth, F. Schunemann, J. P. Toennies, J. Chem. Phys. 102 (1995) 6258.

[8] J. F. Lehmann, H. P. A. Mercier, G. J. Schrobilgen, Coord. Chem. Rev. 233-234 (2002) 1.

[9] W. L. Vos, L. W. Finger, R. J. Hemley, J. Hu, H. K. Mao, J. A. Schouten, Nature 358 (1992) 46.

[10] M. S. Somayazulu, R. J. Hemley, A. F. Goncharov, H. K. Mao, L.W. Finger, Eur. J. Solid State Inorg. Chem. 34 (1997) 705.

[11] W. L. Mao, H. K. Mao, Proc. Nat. Acad. Sci. 101 (2004) 708.

[12] M. S. Dresselhaus, I. L. Thomas, Nature 414 (2001) 332.

[13] L. Schlapbach, A. Zuttel, Nature 414 (2001) 353.

[14] W. Grochala, P. P. Edwards, Chem. Rev. 104 (2004) 1283.

[15] C. -S. Zha, H. K. Mao, R. J. Hemley, Proc. Natl. Acad. Sci. 97 (2000) 13494.

[16] J. L. Feldman, J. H. Eggert, J. DeKinder, R. J. Hemley, H. K. Mao, D. Schoemaker, Phys. Rev. Lett. 74 (1995) 1379.

[17] A. Anderson, R. Savoie, J. Chem. Phys. 43 (1965) 3468.

[18] V. Diatschenko, C. W. Chu, D. H. Liebenberg, D. A. Young, M. Ross, R. L. Mills, Phys. Rev. B 32 (1985) 381.

The invention claimed is:

1. A method of storing hydrogen, which comprises maintaining a molecular compound comprising hydrogen and a hydrocarbon, in the solid state, at ambient pressure and a temperature of about 10 K, wherein the compound comprising hydrogen and a hydrocarbon is $(H_2)_4CH_4$.

2. The method of claim 1, wherein the hydrogen in $(H_2)_4CH_4$ is liberated by raising the temperature of the compound above about 23 K.

3. The method of claim 2, wherein the temperature of the compound is raised isobarically.

4. The method claim 1, wherein the partial pressure of hydrogen is less than about 10 bar.

* * * * *